April 22, 1941.                P. W. GUMAER                2,238,935
CONSTANT EVAPORATION PROCESS AND APPARATUS
Filed Sept. 1, 1938
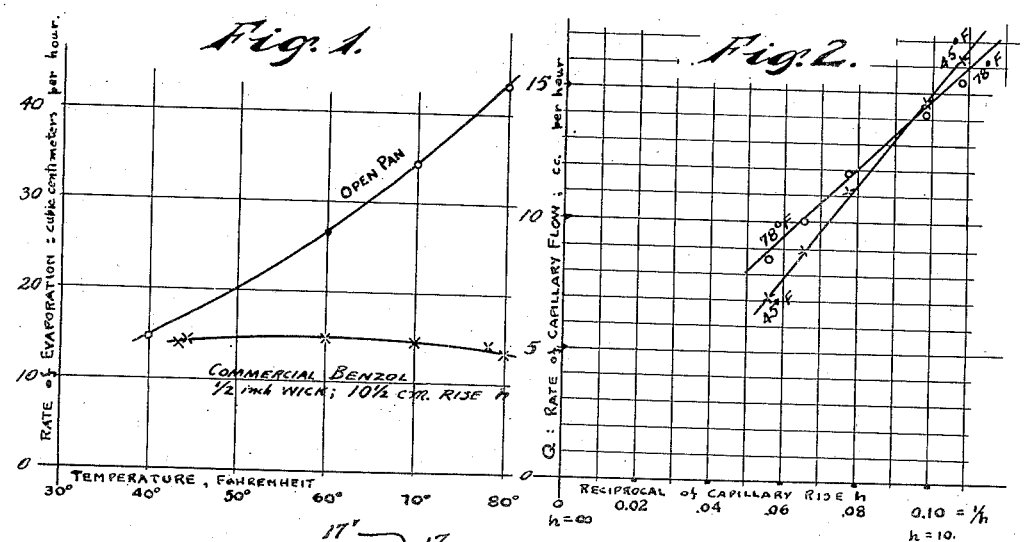
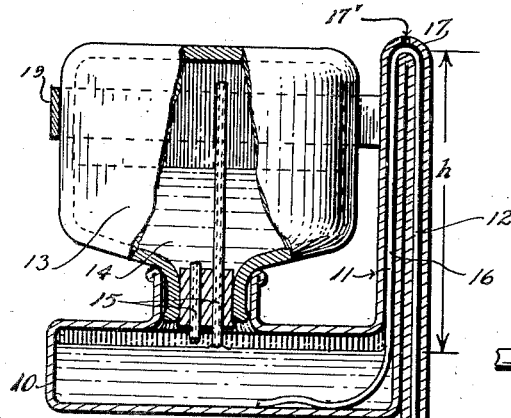
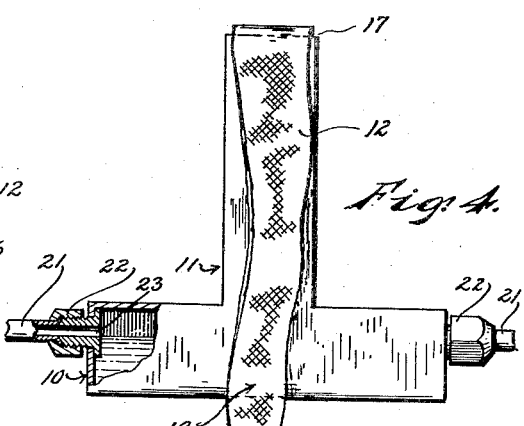
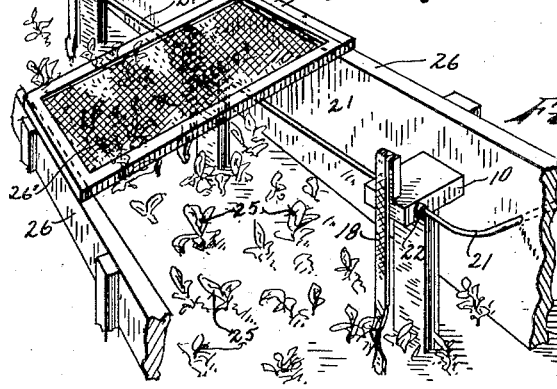
INVENTOR:
Percy W. Gumaer,
BY Christian R. Nielsen
ATTORNEY.

Patented Apr. 22, 1941

2,238,935

UNITED STATES PATENT OFFICE 2,238,935

CONSTANT EVAPORATION PROCESS AND APPARATUS

Percy Wilcox Gumaer, West Englewood, N. J.

Application September 1, 1938, Serial No. 228,053

6 Claims. (Cl. 299—23)

This invention relates to the capillary flow of liquid to transfer liquid from one vessel to another vessel, or to regulate the rate of evaporation of a volatile liquid, or to supply at a constant rate a liquid, such as a chemical, to another chemical or chemicals, and it is the object of the invention to provide an improved method of and apparatus for obtaining the exact rate of capillary flow of a liquid at any two predetermined temperatures and approximately an equal rate of evaporation of the liquid within the range of said two predetermined temperatures.

Additional objects, advantages and features of invention reside in the constructions, arrangements and combinations herein described and claimed.

In the drawing—

Figure 1 is a graph showing effect of using the invention contrasted to the result of ordinary evaporation.

Figure 2 is a graphical showing of the relation between rate of flow and height of rise in my device.

Figure 3 shows an embodiment of the invention.

Figure 4 illustrates a modified form of the invention.

Figure 5 shows a system applied to a tobacco bed.

Figure 6 shows a further modification of the evaporator.

The means to effect this desired result are designed from consideration of the factors involved in the flow of a fluid through a capillary, and through the experimental discovery of the proper co-relation of parts to take proper advantage of the characteristics of that flow.

The rate of flow of a liquid through a capillary depends upon three properties of the liquid: surface tension, viscosity, and density. Each of these properties varies with temperature in such a manner that the rate of flow may be made equal at two specified temperatures and approximately equal for intermediate temperatures. The method will be explained by reference to wicks, but obviously any capillary medium may be used, and the term "wick" is used with this broad meaning herein.

Derivation of equation for "Q," rate of flow of liquid in a capillary or wick which comprises an uppermost bight portion and a pendant portion longer than the capillary rise to the bight.

Poisseuille's law:

$$Q = \frac{\pi p R^4}{8hn} \quad (1)$$

Applied to the wick or capillary described:
Effective pressure causing flow $= \pi R^2 p$
Capillary force $= 2\pi R a$
Hydrostatic head $= \pi R^2 ghd$ Now $\pi R^2 p = 2\pi R a - \pi R^2 ghd$ and $$p = \frac{2a}{R} - ghd$$

Substituting for "p" in Equation 1 and considering "N" capillaries:

$$Q = \frac{\pi R^4 N}{8hn}\left(\frac{2a}{R} - ghd\right)$$

$$Q = \frac{\pi N R^3 a}{4hn} - \frac{\pi g R^4 N d}{8n} \quad (2)$$

Where:
$p$ = pressure per unit area
$h$ = vertical rise of capillary above liquid
$R$ = mean radius of capillaries
$g$ = acceleration of gravity
$n$ = viscosity
$a$ = surface tension
$d$ = density of liquid
$N$ = number of capillaries
$\pi$ = ratio of circumference to diameter of circle
$Q$ = rate of flow Limiting conditions: Pendant portion of capillary must be longer than "h". For very small values of "h" and for liquids of low viscosity, curves of Figure 2 may bend away from a straight line at the upper end, indicating that a term $$\left(-K\frac{mv^2}{2}\right)$$

must be added to Equation 2 to correct for kinetic energy. Ordinarily this term is so small that it may be neglected. Equation 2 holds only for liquids that completely wet the fibers of the wick or capillary. That is, where "$\theta$" is the angle of contact between liquid surface and wick fibres: cosine $\theta = 1$; and $\theta$ must be zero.

Application of Poiseuille's law to a vertical wick, having no pendant portion,

In this case the liquid rises to an ultimate height $h^1$ and if no evaporation is permitted, no liquid will flow in the capillaries, i. e., $Q=0$.

So that, from Equation 2

$$\frac{\pi NR^3 a}{4h^1 n} = \frac{\pi g R^4 N d}{8n}$$

whence:

$$\frac{a}{h^1} = \frac{gRd}{2}$$

and:

$$h^1 = \frac{2a}{gRd}$$

the ultimate rise.
or:

$$a = \frac{gRh^1 d}{2}$$

the usual equation used in determining the surface tension of a liquid by measurement of its rise in a calibrated capillary.

The foregoing analysis of the factors involved in the rate of flow of a fluid through a capillary is based on Poiseuille's equation, which may be found in advanced textbooks on physics.

The application of the relations derived from formula to the present problem, that of obtaining the same flow at two limiting temperatures and substantially constant flow therebetween, is now undertaken.

Let $Q_1, a_1, n_1, d_1,$ and $Q_2, a_2, n_2, d_2$ equal the respective quantities as above defined for two temperatures $T_1$ and $T_2$.

Let $Q_1 = Q_2$ at temperatures $T_1$ and $T_2$. Then, from Equation 2:

$$\frac{\pi NR^3 a_1}{4hn_1} - \frac{\pi g R^4 N d_1}{8n_1} = \frac{\pi NR^3 a_2}{4hn_2} - \frac{\pi g R^4 N d_2}{8n_2}$$

Solving for "$h$":

$$h = \frac{2}{Rg}\left(\frac{a_1 n_2 - a_2 n_1}{d_1 n_2 - d_2 n_1}\right) \qquad (3)$$

For a given wick, $h$ can be determined by experiment, as shown in Figure 2 of the drawing. The wick or capillary constants "R" and "N" may be calculated by substitution in the equations. For example using a standard half-inch wick with commercial benzol at a capillary rise $h=10.6$ cm., rate of flow $Q=0.00385$ cc. per second: $R=0.00471$ and $N=509$. Knowing the critical constants, the required "$h$" for constant flow at other temperatures and/or other liquids may be calculated. For an equal flow at 10° C. and 30° C. the following examples of application are given:

|  | Benzene | Toluene | Monochlorobenzene |
|---|---|---|---|
| $a_{10}$ | 27.6 | 27.3 | 32.0 |
| $n_{10}$ | 0.00561 | 0.00518 | 0.00704 |
| $d_{10}$ | 0.868 | 0.857 | 1.0956 |
| $a_{30}$ | 30.2 | 29.6 | 34.4 |
| $n_{30}$ | 0.00757 | 0.00668 | 0.00917 |
| $d_{30}$ | 0.889 | 0.876 | 1.117 |
| $(Rg)h$ | 50.3 | 49.2 | 57.4 |
| $h$ centimeters | 10.9 | 10.7 | 12.4 |

The relation between variables which is determined by the equations before derived is shown by the graphs in Figures 1 and 2. Figure 1 shows at varying temperatures the quantity of benzol transported a vertical height of 10½ centimeters by a ½ inch standard wick in my device is substantially constant, being the same at 78 and at 45 degrees and being only slightly increased between these limits. Figure 2 shows the relation between the rate of flow and the vertical rise "$h$" at constant temperature; these variables are inversely proportional and therefore $1/h$ has been plotted to rectify the relationship to a straight line characteristic. At the two temperatures considered, 45 and 78 degrees Fahrenheit, for example, the lines are of different slope, due to different values of the determinant constants because of unlike temperature coefficients, and are found to intersect at a point where $1/h$ equals 0.096 and thus $h$ equals 10.4 centimeters at that point. We have thus found a height of wick which results in equal rate of flow at the limiting temperatures specified, and this value of $h$ gives the characteristic of flow versus temperature shown in Figure 1. Also shown in Figure 1 is the relationship between the temperature and the quantity of benzol evaporated from an open pan, its area being such that at the lower temperature the rate of evaporation is about the same as the flow in the one-half inch wick with a vertical rise of 10.4 centimeters. It will be seen that the rate of evaporation from the open pan is quite sensitive to temperature variation, increasing very greatly with the increased temperature.

An embodiment of a practical device adaptable to various applications for carrying out the invention is shown in Figure 3. A shallow pan 10 is provided, from one end of which a tube 11, of cross section suited to closely envelop a wick 12, is upwardly projected a suitable distance 16, a bend downward forming a bight 17 and a pendant portion 18. An aperture 17' is formed in the bight 17, to avoid a syphon effect. Any other type of capillary medium might be used in the described conformation. For instance, in the case of chemically active reactants glass capillary tubes might be directed upwardly from the reservoir, then downwardly from the bight there formed. A reservoir 13 communicates with the pan 10, flow of the liquid 14 being controlled by the constant level device 15. A band 19 may be provided to secure the reservoir 13 against accidental dislodgment. The portion 16 of the capillary need not be exactly vertical but will have a vertical component which is the difference in altitude between the liquid level and the bight 17. The pendant portion 18 also need not be vertical but its vertical component of length from the bight 17 must exceed the vertical capillary rise $h$ in the portion 16 of the capillary, in order that liquid may drip freely from the lower end of the portion 18 without back pressure at the bight 17 which would destroy the calculated characteristics of flow. Liquid flow by drops from the end of the capillary will now correspond to the lower curve of Figure 1 and be substantially constant between the two temperatures at which it is equal, which temperatures may be chosen by calculated selection of the vertical capillary rise $h$. The capillary transported liquid may be delivered directly to a chemical reaction being supplied or otherwise utilized as desired.

In the treatment of blue mold (a fungus disease of tobacco plants) it is customary to set open pans of benzol in tobacco seed beds during the night, and to cover the beds with glass sash or a tight cloth. Between 40 and 80 degrees F. the evaporation from open pans may vary nearly 300 percent as shown by the upper curve on Figure 1. An apparatus which will evaporate benzol at a substantially constant rate independent of temperature as indicated by the lower curve of Figure 1 will maintain a more constant vapor concentration in the seed bed during the gassing operation. A minimum of 0.05% benzol vapor throughout the night is necessary to prevent the disease. Over 0.5% of benzol vapor causes stunting of the plants and more than 2% will kill the plants in one night.

The use of wicks to evaporate liquids is well known in the arts. Control of the rate of evaporation with temperature, however, has always required manual adjustment for each temperature. With my apparatus a constant rate of flow or evaporation of the liquid can be obtained for any temperature within the range of any two predetermined temperatures as indicated by Equation 3. When designed for a particular liquid and capillary medium no further adjustment is necessary to maintain the evaporation rate as indicated by the lower curve of Figure 1.

The application of these findings to attaining a constant rate of evaporation is met by an arrangement which insures that no liquid evaporates without first having risen the required distance in the wick, and further that all liquid which the capillarity of the wick has transported be evaporated. The first condition guards against excessive evaporation, the second, against insufficient evaporation, and both conditions being met, insures that rate of evaporation shall equal the rate of flow in the wick. This latter rate, I have shown, may be made substantially constant over the temperature range encountered by suitable choice of capillary rise, and it follows that evaporation also will be substantially constant over that range.

A satisfactory embodiment of the invention to this result is shown in Figure 4. The shallow pan 10 may be connected into a pipe line 21 by means of the fittings 22 and 23, or other means of filling with liquid may be employed. The upwardly projected portion 11 enclosing the wick 12 is terminated at the bight of the wick, and the pendant portion of the wick 18 is unenclosed. If desired, a small portion of the pendant capillary 18 may be enclosed by an extension of the tube 11, which may safeguard against evaporation prior to the liquid passing the bight 17.

It will be seen that a capillary rise, $h$, from the liquid level in the pan 10 to the top of the tube 11 is defined; that this portion 16 of the wick is protected against evaporation; and that the pendant portion 18 of the wick is sufficient to evaporate all liquid reaching the bight 17.

It should be noted that the capillary rise "$h$" is so chosen that constant evaporation is attained over the temperatures encountered, but that the actual flow is dependent on the cross sectional area of the wick. "$h$" is the vertical component of the length of wick from liquid to "bight"; the capillary need not be vertical.

The ordinary vertical style of wick would not operate in the required manner, as may be seen from the afore given equation for capillary rise. Assuming a very long vertical wick above liquid with no evaporation (such as a glass capillary tube) the liquid will rise to a maximum height $h'$ and Q equals zero. However, with evaporation there is a flow of liquid upward and Q is not zero. At low temperature evaporation is slow and liquid rises nearly to $h'$. At higher temperatures evaporation is more rapid and liquid does not rise so high. As Q is proportional to $1/h$, Q is greater at high temperature and less at low temperature. In other words, a vertical wick of unlimited length gives a greater variation in the rate of evaporation than does an open pan evaporator.

In the use of pure benzol it has been found that evaporation is so rapid that the benzol in the wick is chilled below its freezing point (41.9 degrees Fahrenheit) and congeals even at 55° F., which greatly reduces the rate of flow and consequent evaporation. This has been overcome by the addition of a diluent to the benzol which lowers its freezing point. Any volatile liquid which lowers the freezing point of benzol such as xylol, may be used and I have found that 15% of toluol is effective to this end. It happens that the commercial grade of benzol, called 90% benzol, contains approximately 15% of toluol and so is of suitable characteristics for use under ordinary conditions.

It has also been that there is some fouling of the capillary by the gums, waxes, and other non-volatile impurities which may be present in commercial grades of benzol. However, this difficulty is overcome by adjustment of the length of the pendant portion 18 of the capillary wicking so that a slow drip of liquid occurs, and the impurities are flushed out of the wick. The liquid is caught in a shallow pan and completes its evaporation therefrom. A rate of drip of about one drop in five minutes is sufficient that the solubility of the impurities be not exceeded and they be completely carried away from the wick, maintaining it clean and of the constant physical properties essential to functioning of the unit.

As a constant liquid level device is not practical in a tobacco seed bed, a shallow pan device of the type shown in Figures 4, 5, or 6 may be used. The pan 10 is made of large area relative to the depth of liquid therein when full, and the capillary rise $h$ varies in a practical device only about 1.5 cm. from the value when full to the value when empty. This variation however, by proper adjustment of the device, may be advantageously utilized in limiting the "drip" of the wick. This result is attained by making the wick of such length that it will drip when the pan is full but will not drip when the pan is but part filled, due to the increased capillary rise $h$ reducing the capillary flow. Thus, the non-volatile impurities will be flushed out during the first part of operation yet there will be no drip of fluid during the later stages of evaporation.

A valuable modification results from selecting a value of $h$ slightly less than that which results in equality of flow, which effects a greater rate of evaporation at low temperatures than the higher range. It may be seen from Figure 2 that at greater values of $1/h$, i. e., lesser values of $h$ at the intersection, the characteristics diverge, with the curve taken at the lower temperature giving the higher rate of flow. This phenomenon is of value as applied to the control of blue-mold, as the most active sporulation of the fungus occurs at 42 degrees to 63 degrees Fahrenheit, and an increased concentration of benzol vapor is desirable to control this greater activity in the lower temperature range.

A practical installation of my system is shown in Figure 5. A series of evaporator units 10 are provided, spaced at proper intervals over the area of the bed to maintain the requisite strength of benzol vapor in the atmosphere around the plants 25 under the conditions of ventilation which prevail. Protecting walls 26 and a tight-fitting cover 26' are provided to minimize ventilation, thus requiring less benzol and permitting a more uniform atmosphere to be maintained throughout the bed. The cover 26' may be of glass sash, or unbleached sheeting, 55 x 60 mesh, four yards per pound, is recommended as the cheapest standard cloth which will retain sufficient vapor in the plant bed and yet permit penetration of night rains through the cover. Wetting the covering at sunset greatly increases the vapor concentration by reducing leakage from the bed. The units 10 are set at slightly lower successive levels and are connected by a pipe-line 21. A supply tank 27 is provided at the higher end, and a receptacle 28 is placed at the lower end of the line. A cascade is thus seen to be formed, and on placing a slight excess of liquid in the tank 27, the units 10 will be successively filled to equal levels in each, the surplus liquid flowing off into the receptacle 28 and being saved for future use. The purpose of the excess, which may be any convenient amount from a few drops to the full capacity of the receptacle 28, is an indication and insurance that all the units 10 are properly filled.

The proportions of the units 10 are such that a filling of benzol in the early evening will be completely evaporated during the night. There is then no need of attention in the morning to prevent excessive vapor concentration with resultant plant mortality when the radiant heat of the sun may raise the temperature extremely.

While I have specifically described various constructions, this is by way of illustration only and I consider as my own, all such modifications as fairly fall within the scope of the appended claims.

I claim:

1. The method of evaporating liquid, which comprises providing a shallow container for the liquid to be evaporated and a capillary member, and causing capillary flow of the liquid through the capillary member from the container at a substantially constant rate and an equal evaporation of the liquid at and within the range of two predetermined temperatures by folding the capillary member upon itself and arranging the capillary member with an end of one portion engaged in the liquid in the container and the bight at a predetermined height above the liquid in the container, determining the height of the bight of the capillary member above the liquid in the container by the surface tension, viscosity and density of the liquid in relation to the limiting temperatures at which the liquid is to be evaporated, sealing from the atmosphere the portion of the capillary member at one side of the bight having the end disposed in the liquid in the container and exposing the portion of the capillary member at the opposite side of the bight arranged of a length to extend to a point below the container and exposed to the atmosphere.

2. In a liquid evaporator, a closed container for the liquid to be evaporated, and means to cause a substantially constant capillary flow of the liquid from the container within the range of two predetermined temperatures comprising a tubular member in communication with and extending upwardly to a predetermined height above the container determined by the surface tension, viscosity and density of the liquid in relation to the limits of said temperatures, and a capillary member extended through said tubular member with an end thereof disposed in the liquid in the container and a pendent portion exposed to the atmosphere extending to below the container.

3. In a liquid evaporator, a closed container for the liquid, a supply reservoir for the liquid in communication with the container, means to cause the liquid to flow from said receiver into and maintain the liquid at a substantially constant level in the container, and means to cause a substantially equal evaporation of the liquid in the container at and within two predetermined temperatures, comprising a U tube having one leg connected to the top of and extending upwardly from the container to a predetermined height determined by the surface tension, viscosity and density of the liquid in relation to the limitations of said temperatures and the other leg extending to a point below the container, and a capillary member extended through said tube with one end extending from and disposed in the liquid in the container and the opposite end extending from the other leg of said tube.

4. The method of evaporating liquid at a substantially constant rate within the range of two predetermined temperatures, which consists in providing a closed container containing the liquid to be evaporated, and causing a substantially constant rate of capillary flow of the liquid from the container and rise of the capillary flow of the liquid to a predetermined height above the liquid in the container and to the point of commencement of evaporation of the liquid determined by the surface tension, viscosity and density of the liquid in relation to the limiting temperatures, and maintaining the liquid in its capillary rise to the point of commencement of evaporation out of contact with the atmosphere.

5. The method of evaporating benzol, which comprises providing a closed shallow container for the benzol and a capillary member having one end disposed in the benzol in the container and having an upwardly extending portion and a pendent portion of greater length than the upwardly extending portion, and evaporating the benzol in the container at a substantially constant rate at and within the range of two predetermined temperatures by causing a constant rate of capillary flow of the benzol from the container through the capillary member and rise of the benzol in the capillary member to a predetermined height above the benzol in the container determined by the surface tension, viscosity and density of the benzol in relation to the limiting temperatures within the range of which the benzol is to be evaporated.

6. In a liquid evaporator, a closed container for the liquid to be evaporated and means to cause a substantially constant capillary flow of the liquid from the container within the range of two predetermined temperatures, comprising a capillary member having one end disposed in the liquid in and extending upwardly to a predetermined height above the container determined by the surface tension, viscosity and density of the liquid in relation to the limitations of said temperatures and thereby adapt the capillary member to cause capillary flow of the liquid from the container at a substantially constant rate within the range of said two predetermined temperatures.

PERCY WILCOX GUMAER.